(12) United States Patent
Defrance et al.

(10) Patent No.: US 8,218,577 B2
(45) Date of Patent: Jul. 10, 2012

(54) SECURE MECHANISM FOR TRANSMITTING COUNTER VALUE IN THE CONTEXT OF TRANSMISSION OF A SYNCHRONIZING SIGNAL IN A PACKET NETWORK

(75) Inventors: Serge Defrance, Rennes (FR); Thierry Tapie, Rennes (FR); Gael Mace, Langan (FR)

(73) Assignee: Thomson Licensing, Boulogne-Billancourt (FR)

( * ) Notice: Subject to any disclaimer, the term of this patent is extended or adjusted under 35 U.S.C. 154(b) by 155 days.

(21) Appl. No.: 12/225,016

(22) PCT Filed: Mar. 13, 2007

(86) PCT No.: PCT/FR2007/050919
§ 371 (c)(1),
(2), (4) Date: Sep. 11, 2008

(87) PCT Pub. No.: WO2007/104892
PCT Pub. Date: Sep. 20, 2007

(65) Prior Publication Data
US 2009/0073976 A1  Mar. 19, 2009

(30) Foreign Application Priority Data
Mar. 13, 2006  (FR) ...................................... 06 50838

(51) Int. Cl.
*H04J 3/06* (2006.01)
(52) U.S. Cl. ..................................................... 370/503
(58) Field of Classification Search .................. 370/503, 370/507, 516, 518
See application file for complete search history.

(56) References Cited

U.S. PATENT DOCUMENTS

| 4,457,005 | A  | * | 6/1984  | Burke et al. ................... 375/328 |
| 4,752,748 | A  | * | 6/1988  | Grzeszykowski ............ 331/1 A |
| 5,459,524 | A  | * | 10/1995 | Cooper ......................... 348/507 |
| 5,805,602 | A  | * | 9/1998  | Cloutier et al. ............... 370/516 |
| 7,657,333 | B2 | * | 2/2010  | Bradford et al. ................. 700/51 |
| 2007/0053384 | A1 | * | 3/2007 | Roberts et al. ................. 370/516 |

FOREIGN PATENT DOCUMENTS

| EP | 0624983    | 11/1994 |
| JP | 2000332831 | 11/2000 |

OTHER PUBLICATIONS

Search Report Dated Sep. 19, 2007.

* cited by examiner

*Primary Examiner* — Chi Pham
*Assistant Examiner* — Farah Faroul
(74) *Attorney, Agent, or Firm* — Tutunjian & Bitetto, P.C.

(57) ABSTRACT

An apparatus for transmitting and receiving packets in a packet switching network that includes at least two stations. The apparatus includes a phase-locked loop, as well as means for receiving packets containing samples of the network, the samples being derived from data sampled every $T_{ech}$ period, where $T_{ech}$ is derived from a time base synchronized on all the stations of the network and the samples being associated with incremental values predicting at least one sample, calculating, in case of interruption of packet reception, a prediction of a sample that should have been received, by adding an increment value to a received sample value.

9 Claims, 1 Drawing Sheet

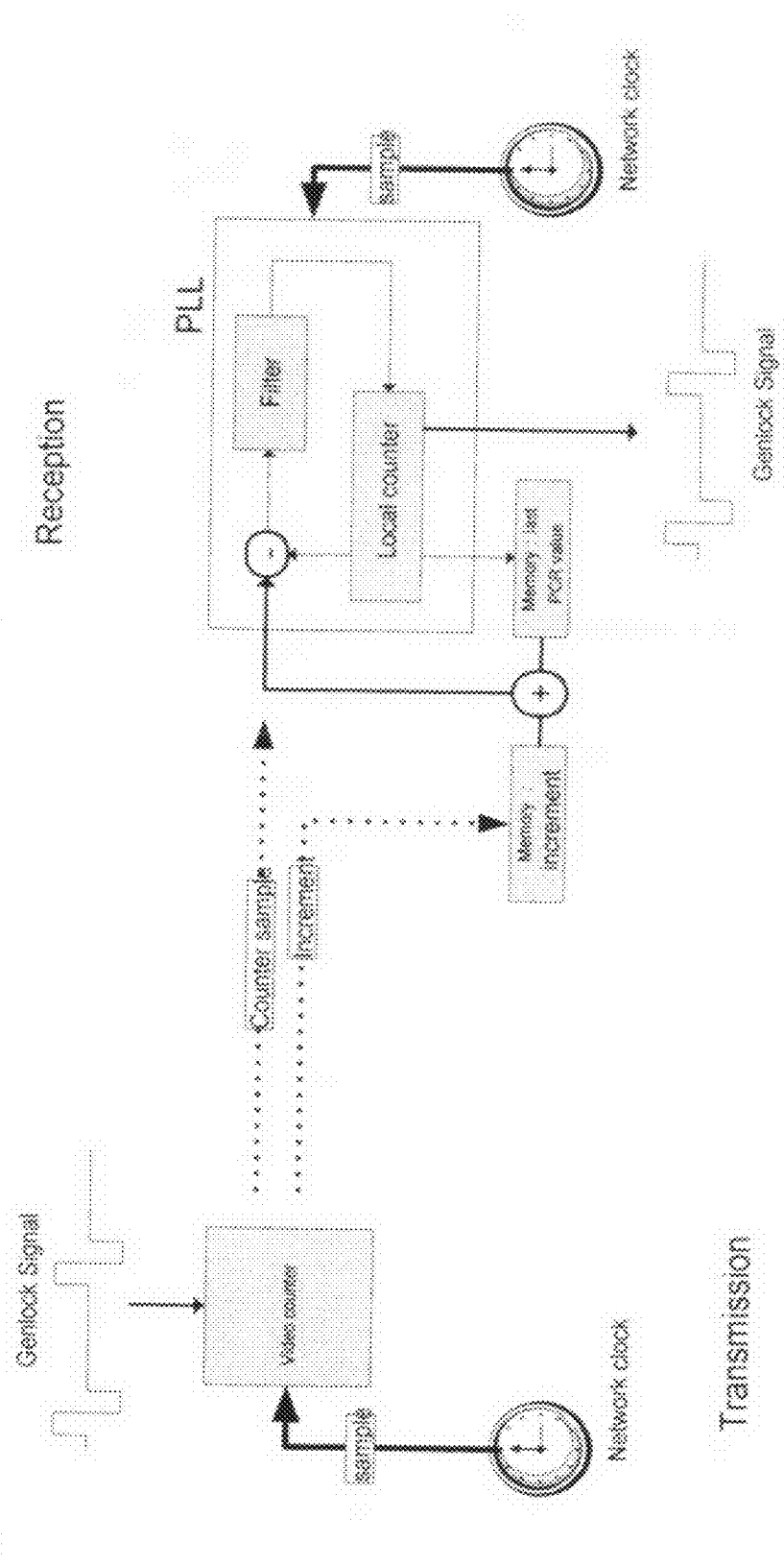

SECURE MECHANISM FOR TRANSMITTING COUNTER VALUE IN THE CONTEXT OF TRANSMISSION OF A SYNCHRONIZING SIGNAL IN A PACKET NETWORK

This application claims the benefit, under 35 U.S.C. §365 of International Application PCT/FR2007/050919, filed Mar. 13, 2007, which was published in accordance with PCT Article 21(2) on Sep. 20, 2007 in French and which claims the benefit of French patent application No. 0650838, filed Mar. 13, 2006.

SCOPE OF THE INVENTION

The present invention relates to the domain of communication networks.

The present invention relates more particularly to a transmitter device and a receiver device for the secure transmission of a synchronisation signal, for example of "Genlock" type (synchronisation locking), on a packet switching network, of for example IP (Internet Protocol) type.

PRIOR ART

The transmission of a Genlock signal in an IP network is an important stage in the conversion of video studios to IP networks as a single infrastructure.

The principle consists in driving a counter by the gunlock signal that is to be transmitted. This counter is regularly sampled. The system performance is based principally on the regularity of the sampling mechanism. The sampled value is transmitted on the IP network by standard means. On the reception side, the samples are taken into account regularly (same instants as the sampling on the reception side) by the PLL ("Phase Locked Loop"), which regulates its internal frequency so that the difference between the received sample and its internal counter is null.

The prior art discloses, through the European patent application EP 0 624 983 (Thomson), a synchronisation arrangement for a compressed video signal. This European patent application describes a device to develop the synchronisation of an intermediary layer of a signal such as the transport or multiplex layer of a compressed multilayer video signal. This device comprises, on the encoding side, the means to include a temporal descriptor reference, such as the counter value of a K modulo counter, and the means to provide a differential temporal descriptor that can be updated by the transit time of the respective circuits (multiplexing) as the signal is in transit in these circuits. At the reception level, a counter reacts according to a clock signal of the commanded receiver and the value of this counter is sampled upon arrival of the temporal descriptors contained in the transport layer. The temporal descriptors and the differential temporal descriptors are extracted from the signal and combined to form a corrected temporal descriptor. The successive sampled counter value differences of the receiver counter are compared with the corresponding successive corrected temporal descriptor differences in order to supply a signal to command the receiver clock signal.

The invention of this European patent application of the prior art is within the framework of a broadcast network with a constant transmission bitrate. The sampling of local counters is carried out at the instant of reception of packets containing samples of the master counter. The purpose of this previous invention is to supply corrective information enabling re-establishment of a correct sampling value transmitted from a master counter via a link that functions but that is degraded by a transmission jitter.

SUMMARY OF THE INVENTION

The present invention is situated within the context of a packet switching network, of the IP type for example, in which the transmission time is not constant. The video stream, for which the present invention proposes to transport the synchronisation signal, is not assumed to be of constant bitrate, or linked to a multiplexing system of information relating to the synchronisation signal transmission. It is even explicitly assumed that within the context of an IP network, the synchronisation information uses its own IP packets: two data streams, video and synchronisation, independent from the transmission network perspective, are present. The present invention assumes that a synchronous signal is available on all the stations, generated by another time base, synchronised by another independent system, based for example on the IEC61588 standard, and it is during the occurrence of this signal that the samples are generated or taken into account, and not at the instances of packet reception or transmission that have no importance in the scope of the present invention.

The technical problem that the present invention proposes to resolve consists in enabling a receiving station to continue to function, even in degraded mode, while the link via the network is totally interrupted.

For this purpose, the present invention concerns, according to a first aspect, a device able to transmit packets in a packet switching network, comprising at least two stations, comprising the means to:

Means for receiving a signal,

Means for driving a counter using said signal, characterized in that it comprises:

Means for sampling said counter at every $T_{ech}$ period, where $T_{ech}$ is from a time base synchronised on all the stations of said network, Means for calculating an increment value predicting at least one next value of the counter sampled, Means for transmitting the sampled values and the increment values in an associated manner in packets.

According to an embodiment, said signal is of the Genlock type (synchronisation locking).

According to a particular embodiment, the incremental value is 135,000, the sampling period is 5 ms and the counter clock, driven by the Genlock signal, is 27 MHz.

According to a second aspect, the present invention concerns, a device able to receive packets in a packet switching network comprising at least two stations, characterized in that it comprises:

a phase locked loop, as well as means for:

means for receiving packets containing samples from said network, said samples coming from data sampled every $T_{ech}$ period, where $T_{ech}$ is from a time base synchronised on all the stations of said network and said samples being associated with incremental values predicting at least one sample, means for calculating, in the case of packet reception interruption, a prediction of a sample that should have been received, by adding an increment value to a received sample value.

Preferably, the time base synchronised on all the network stations is of the IEC61588 type.

According to an embodiment, said communication network is of the IP (Internet Protocol) type.

BRIEF DESCRIPTION OF THE DRAWINGS

The invention will be better understood from the following description of an embodiment of the invention provided purely as an example by referring to the single FIGURE that shows the transmitter and receiver devices according to the present invention.

DETAILED DESCRIPTION OF THE EMBODIMENTS OF THE INVENTION

The principle of the genlock signal transmission is based on a regular sampling of the counter. Regular sampling means that the time period between two samples must remain precisely the same. The counter that is sampled being assumed to be stable as it is locked on the genlock signal that is to be transmitted, the increment between the two values sampled must remain the same, once the system is stabilized.

During the system start-up, the increment value between a sampled value and the next sampled value can change slightly. This is due to the imprecision of different clocks of the system: the counter clock driven by the Genlock signal (video counter on the FIGURE) and the system clock (or network clock on the FIGURE) that calculates the sampling time period. For example, if we suppose that the sampling period is 5 ms and that the counter clock driven by the Genlock is 27 MHz, the increment value should be precisely 135,000. Due to the relative precision of the clocks, the value can be slightly different (135,008 in the case of 30 ppm clocks).

The exact increment value can be attained after several sampling periods. It can also change in time due to the clock frequency drift. The speed is very low for this (typically 75 mHz/s).

The transmission part that is responsible for sampling the counter driven Genlock signal (video counter on the FIGURE) as well as the transmission of the sampled value, can also calculate a precise increment and transmit it.

It is here assumed that the transmission part transmits an increment value with the sampled value. This increment value is re-calculated with each sample. This can change to follow the clock drift according to the frequency characteristics of the genlock signal (maximum drift of 75 MHz/s). A more rapid drift can be filtered.

The reception part memorises the increment value every time it receives a new sampled value, just as it will memorise the sampled value. When a new sampling signal takes place, if no new sampled value has been received (because it was lost in transmission on the IP network), the PLL calculates a prediction of the value that should have been received. It must add the increment value to the last sampled value received.

The PLL can proceed in this way as long as no new sampled value is received. It must memorise the calculated sampled value and use it as if it was the last received value for the next time.

If one or more samples are missing, no difference should exist between the transmitted calculated values and the values that were lost due to the frequency drift. When the transmission functions again, the value received must be equal to the calculated value. The interruption to transmission should be completely transparent for the PLL. This will be the case when a packet is lost from time to time in the network. It should enable use of a non-secure protocol such as UDP (User Datagram Protocol) to transport the samples and increments.

In the case of a long interruption, the mechanism will ensure that the PLL frequency remains stable and that the re-calculated counter does not drift too far from the value that it should have had. When the transmission functions again, there may be a difference between the new sampled value received and the calculated value. The PLL takes into account the new value received and changes so as to compensate for the difference. The frequency characteristics of the PLL guarantee that the signal delivered does not drift too rapidly and that it respects the constraints of the genlock signal.

The single FIGURE shows the transmitter and receiver devices according to the present invention.

The invention is described in the preceding text as an example. It is understood that those skilled in the art are capable of producing variants of the invention without leaving the scope of the patent.

The invention claimed is:

1. An apparatus for transmitting packets in a packet switching network over which an apparatus for receiving said packets is connected, wherein said apparatus for transmitting packets comprises:
    means for receiving a synchronisation signal,
    means for driving a counter using said synchronisation signal,
    wherein said apparatus further comprises:
    means for sampling said counter at every $T_{ech}$ period, where $T_{ech}$ is derived from a non-transmitted time base synchronised on the apparatus for receiving connected over the packet switching network at least two stations,
    means for calculating an increment value predicting at least one next value of the counter sampled,
    means for transmitting the sampled values and the increment values in an associated manner in packets,
    wherein $T_{ech}$ is derived from the time base independent of any source content.

2. The apparatus according to claim 1, wherein the time base synchronised on all the apparatuses connected over the packet switching network is of the IEC 61588 type.

3. The apparatus according to claim 2, wherein the synchronisation signal is of the Genlock type (synchronisation locking).

4. The apparatus according to claim 1, wherein the synchronisation signal is of the Genlock type (synchronisation locking).

5. The apparatus according to claim 4, the counter comprising a clock, wherein the incremental value is of 135,000, the sampling period is 5 ms and the counter clock, driven by the Genlock signal, has a frequency equal to 27 MHz.

6. The apparatus according to claim 1, wherein said packet switching network is of the IP (Internet Protocol) type.

7. An apparatus for receiving packets in a packet switching network over which an apparatus for transmitting said packets is connected comprising at least two wherein said apparatus for receiving packets comprises:
    a phase locked loop;
    means for receiving packets containing samples from said packet switching network, said samples coming from data sampled every $T_{ech}$ period, where $T_{ech}$ is derived from a non-transmitted time base synchronised on the apparatus for transmitting connected over the packet switching network at and said samples being associated with incremental values predicting at least one sample,
    means for calculating, in the case of packet reception interruption, a prediction of a sample that should have been received, by adding an increment value to a received sample value wherein Tech is derived from the time base independent of any source content.

8. The apparatus according to claim 7, wherein the time base synchronised on all apparatuses connected over the packet switching network is of the IEC 61588 type.

9. The apparatus according to claim 7, wherein said packet switching network is of the IP (Internet Protocol) type.

* * * * *